J. R. WILSON.
COMBINED MOLDING AND LOADING TOOL.
APPLICATION FILED NOV. 9, 1909.
1,031,221.
Patented July 2, 1912.
2 SHEETS—SHEET 1.
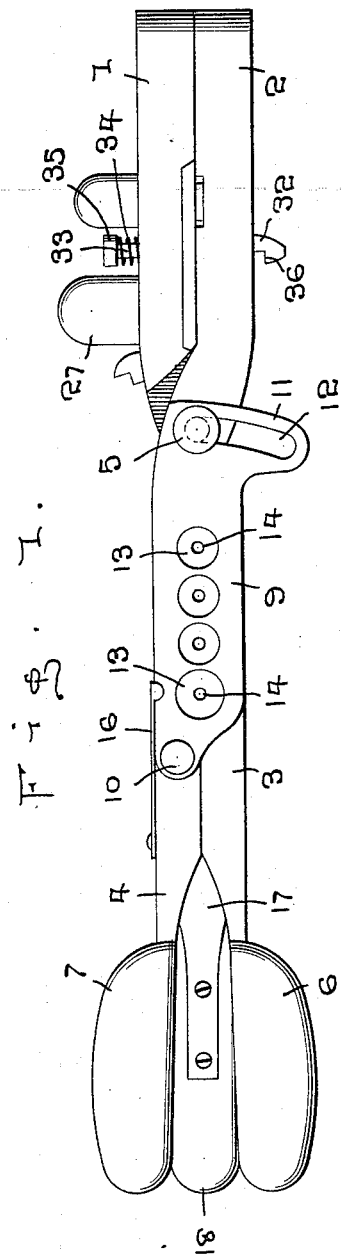
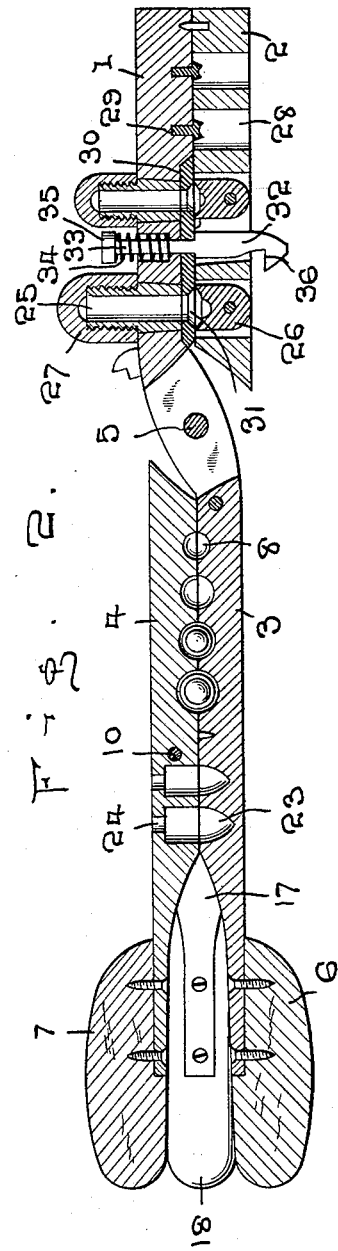
WITNESSES:
Thos. W. Riley
M. Newcomb.
INVENTOR
J. R. Wilson
BY W. J. Fitzgerald
Attorneys

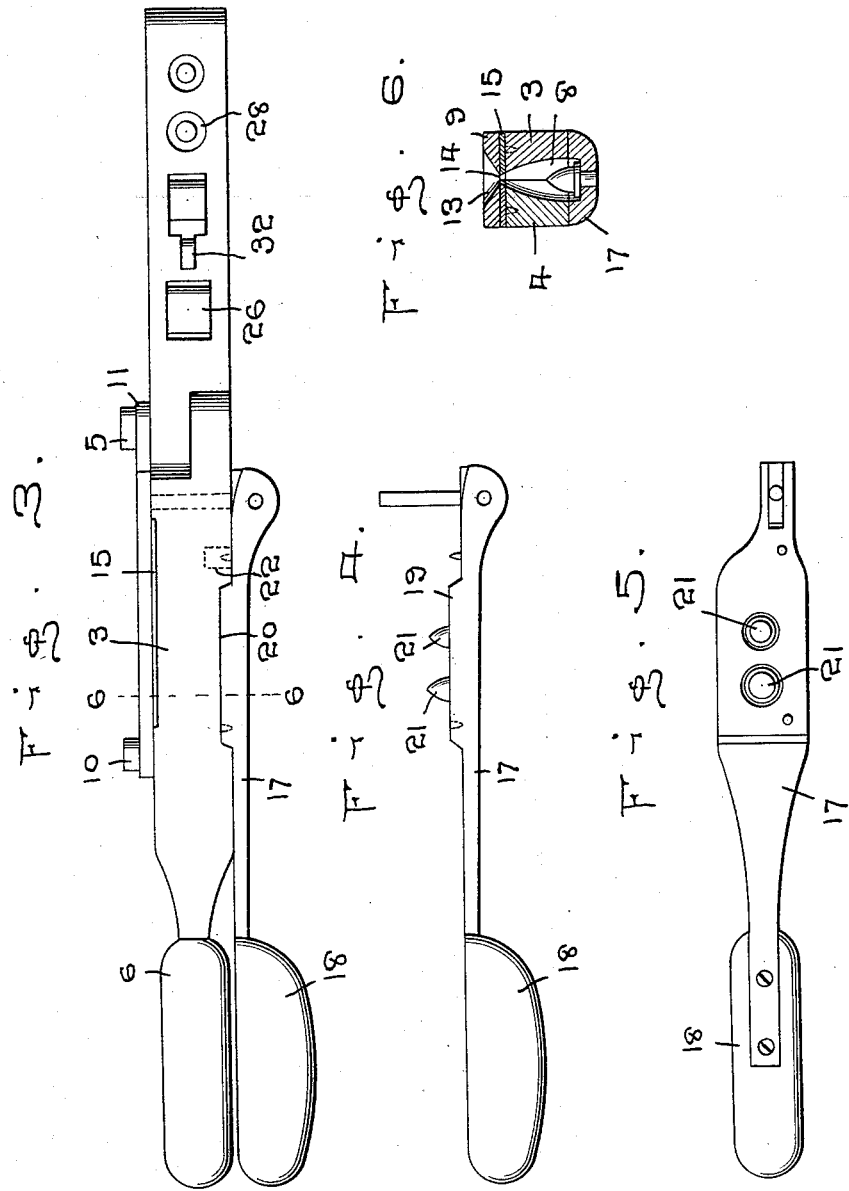

UNITED STATES PATENT OFFICE.

JOHN RUFES WILSON, OF HARTRANFT, TENNESSEE, ASSIGNOR OF ONE-HALF TO ROBERT L. HOSKINS, OF FORK RIDGE, TENNESSEE.

COMBINED MOLDING AND LOADING TOOL.

1,031,221. Specification of Letters Patent. Patented July 2, 1912.

Application filed November 9, 1909. Serial No. 527,005.

*To all whom it may concern:*

Be it known that I, JOHN R. WILSON, a citizen of the United States, residing at Hartranft, in the county of Claiborne and State of Tennessee, have invented certain new and useful Improvements in Combined Molding and Loading Tools; and I do hereby declare the following to be a full, clear, and exact description of the invention, such as will enable others skilled in the art to which it appertains to make and use the same.

My invention relates to new and useful improvements in a combined molding and loading tool and my object is to provide a device of this class whereby various forms of bullets may be molded.

A further object is to provide means for forming cavities in the ends of the bullets.

A further object is to provide means for placing the bullets in the cartridges.

A further object is to provide means for removing the cartridge after the bullet has been placed therein and a further object is to provide means for placing caps upon the cartridges.

Other objects and advantages will be hereinafter referred to and more particularly pointed out in the claims.

In the accompanying drawings forming part of this application, Figure 1 is a plan view of the combined mold and loading tool, showing the same in its closed position. Fig. 2 is a central longitudinal sectional view thereof. Fig. 3 is an edge elevation thereof. Fig. 4 is an elevation of a lever employed in connection with the molding construction. Fig. 5 is a plan view thereof, and, Fig. 6 is a sectional view as seen on line 6—6, Fig. 3.

Referring to the drawings in which similar reference numerals designate corresponding parts throughout the several views, 1 and 2 indicate a pair of jaws, which terminate in body portions 3 and 4, said parts being crossed at a point between the jaws and body portions and are secured together by means of a pivot bolt 5, whereby said parts will have substantially a scissors action, and the free ends of the body portions are provided with handles 6 and 7, respectively, whereby said parts may be readily swung to open or close the same.

The meeting faces of the body portions are provided with a plurality of cavities 8, which when the bodies are moved together, form molds for the bullets and by graduating the sizes of said cavities, bullets of various sizes may be formed.

Immediately above the open ends of the cavities is placed a plate 9, one end of the plate being attached to the body 4 by means of a pivot pin 10, while the opposite end thereof is provided with an extension 11, through which is formed an elongated slot 12, said slot being adapted to receive the pivot bolt 5.

The outer face of the plate 9 immediately over the cavities 8 is provided with depressions 13, through the central portions of which are formed openings 14, said openings being positioned immediately over the cavities and by pouring the molten lead into said depressions, it will descend through the openings and fill the cavities 8, thereby forming a complete bullet. In constructing the bullets in this manner, a neck will be formed thereon by filling the opening through the plate 9 with the metal, and said necks are removed from the bullets by swinging the plate 9 on its pivot pin 10, the elongated slot 12 permitting said pivotal movement and to insure a clean severance of the neck, steel plates 15 are secured to the body portions 3 and 4 immediately below the plate 9.

The portions of the plates 15 adjacent the openings 14 are sharpened and in view of the sharp edges around the openings 14, the metal projecting through said openings will be cleanly severed when the plate 9 is swung on its pivot.

The plate 9 is normally held in position to register with the cavities 8, when the two body portions are brought together by attaching a spring 16 to the body 4, the free end of the spring being engaged with the edge of the plate 9, whereby when the plate is moved laterally to sever the necks from the bullets, the tension of the spring 16 will serve to return the plate 9 to its initial position.

In some instances, it may be desired to form chambers in the inner ends of the bullets, in which instance the base of the cavities 8 are closed by means of a lever section 17, one end of which is pivotally secured to the body 3, the free end of the lever having a handle section 18, whereby it may be securely brought into engagement with the body sections, said lever having a projection 19 thereon which is adapted to enter a groove 20 in the bodies 3 and 4, the face of the projection 19 having conical prongs 21 thereon, which are adapted to project into the cavities 8 and form recesses in the ends of the bullets.

As soon as the molding process has been completed, the handle 18 is released, whereupon a spring 22 will force said lever away from the body portion, thus disengaging the prongs 21 from the cavities, when by separating the body portions, the bullet so formed will be released from the molds.

The cavities 8 are arranged in the meeting faces of the body portions 3 and 4, but if desired, other cavities 23 may be formed in said meeting faces and extended at right angles to the cavities 8, one end portion of the cavities 23 being formed in one of the bodies and the opposite portion in the other body, in which instance an opening 24 is formed in one of the bodies, which communicates with the interior of said cavities.

After the bullets have been molded, they are placed in the usual form of cartridge (not shown) by first entering the cartridges into sockets 25 carried by the jaw 1, the jaw 2 having pivotally mounted therein follow blocks 26 which are adapted to engage the headed end of the cartridge and hold the same within the sockets when the jaws are moved together. A charge of powder is then placed in the cartridge after which the bullet is introduced into the open end of the socket and a cap introduced over the open end of the socket to force said bullet into the cartridge, the exterior of the sockets being threaded to receive the threads on the interior of the caps and it will be readily seen that by turning the caps onto the sockets, the bullets will be forced downwardly and into the cartridges. As soon as the bullets have been properly seated within the cartridges, they are removed from within the sockets 25 and introduced through openings 28 in the jaw 2, while the jaw 1 is provided with mandrels 29 arranged to force the usual form of firing cap upon the cartridges.

In order to readily extract the shells or cartridges 25, an extractor 30 is placed in position to extend over the inner ends of said sockets, said extractor having openings therethrough to correspond to the openings in the sockets and also having depressions 31 therein to receive the rims of the cartridges.

The extractor is normally held seated over the ends of the sockets 25 by means of a latch 32, the stem 33 of the latch projecting through the extractor and the jaw 1 and to a distance beyond said jaw, the outer portion of the stem having a spring 34 surrounding the same, said spring being held in position on the stem by means of a nut 35. Said extractor is very snugly mounted on the stem 33 and rests on the shoulders 32' which are formed between the latch proper and the stem 33, and, as stated, in view of the spring 34, the extractor will be normally held against the jaw 1.

The opposite end of the latch 32 is provided with a shoulder 36, which shoulder is adapted to engage the outer face of the jaw 2, when said jaws are moved apart, thus causing the latch proper to be drawn therewith and in view of the partial twist given the stem of said latch through the binding action and the snug fit of the extractor thereon, said extractor will be drawn from the jaw 1, which action will release the extractor from the socket. The continued outward swinging movement of the jaws will cause the shoulders 36 to be disengaged from the jaw 2, whereupon the spring 34 will draw the latch back to its normal position and the extractor into engagement with the face of the jaw 1 and leave the cartridges protruding therefrom, when said cartridges may be readily grasped and entirely removed from the loading device.

By this construction it will be readily seen that I have provided a cheap and economical form of device for forming bullets and entering the same into cartridges and it will further be seen that in view of the various cavities provided, bullets of various caliber may be readily molded and further that by providing the trimming device as shown, the bullets will be discharged from the molds in a perfect condition.

It will further be seen that after the bullets are properly molded, the outward swinging movement of the body sections of the mold will readily release the bullets.

It will also be seen that by providing sockets in one of the jaws and follow blocks in the other, the cartridges may be readily held therein and by providing the movable extractor, and mounting the same as shown, the loaded cartridges may be readily extracted from the sockets.

What I claim is:

1. In a device of the character described, the combination with a pair of pivoted jaws terminating in body portions, one of said jaws having sockets therein, the other of said jaws having follow blocks in alinement with said sockets, and caps adapted to be applied to the upper ends of said sockets; of an extractor for shells in said sockets, said extractor being adapted to move from one jaw to the other upon the separation of said jaws, and means to return said extractor to its initial position.

2. In a device of the class described, the combination with a pair of jaws pivotally secured together; of sockets carried by one of the jaws, caps adapted to fit over the extended ends of said sockets, whereby when a shell and bullet is placed in the socket, the introduction of the caps onto the sockets will enter the bullets in the shells, a movable extractor receiving the rimmed ends of said shells, follow blocks carried by the opposite jaw adapted to hold the shells in position in the sockets, a latch extending through one of the jaws and having said extractor mounted thereon one end of the latch having a shoulder adapted to be engaged by one of the jaws and move the extractor away from the jaw upon which it is seated and a spring adapted to return the extractor to its initial position when said shoulder is released from said jaw.

3. A device of the character described, comprising a pair of pivoted jaws terminating in body portions, one of said jaws having sockets mounted therein, caps adapted to cover the extended ends of said sockets, follow blocks operatively mounted within the other of said jaws in alinement with said sockets, and means to extract the shells from said sockets when loaded.

4. A device of the character described, comprising a pair of pivoted jaws terminating in body portions, sockets mounted in one of said jaws and extended beyond one face thereof, the extended portions of said sockets being externally threaded, internally threaded caps adapted to engage the extended portions of said sockets and force bullets in shells contained therein, follow blocks pivotally mounted in the opposite jaw, and means to extract the shells from said sockets.

5. In a device of the character described, the combination with a pair of pivoted jaws terminating in body portions, one of said jaws being provided with sockets and the other having follow blocks pivotally mounted therein in alinement with said sockets and caps adapted to engage the extended ends of said sockets; of an extractor plate and a spring-held latch upon which said extractor is mounted adapted to normally retain said extractor adjacent one of said jaws, said extractor plate being adapted to be moved toward the other jaw upon the partial separation of said jaws and return to its initial position upon the continued separation of said jaws.

6. In a device of the character described, the combination with a pair of pivoted jaws terminating in body portions, one of said jaws being provided with sockets, the other of said jaws having follow blocks pivotally mounted therein in alinement with said sockets, and caps adapted to engage the extended ends of said sockets; of an extractor plate, a spring-held latch upon which said plate is mounted and adapted to retain said plate adjacent one jaw, and means on the free end of said latch to engage the outer face of one of said jaws upon the partial separation thereof, whereby said extractor plate is moved toward the opposite jaw, said plate being returned to its initial position upon the continued separation of said jaws.

In testimony whereof I have signed my name to this specification in the presence of two subscribing witnesses.

JOHN RUFES WILSON.

Witnesses:
ELY BEELER,
T. H. WATSON.

---

Copies of this patent may be obtained for five cents each, by addressing the "Commissioner of Patents, Washington, D. C."